United States Patent
Vishwanath

(10) Patent No.: US 7,412,233 B2
(45) Date of Patent: Aug. 12, 2008

(54) CELLULAR COMMUNICATION STANDARD EMPLOYMENT BY MOBILE CELLULAR COMMUNICATION DEVICE FOR NETWORK MANAGEMENT INFORMATION EXCHANGE WITH NETWORK INFRASTRUCTURE DEVICE

(75) Inventor: Arun Vishwanath, Bangalore (IN)

(73) Assignee: Lucent Technologies Inc., Murray Hill, NJ (US)

( * ) Notice: Subject to any disclaimer, the term of this patent is extended or adjusted under 35 U.S.C. 154(b) by 349 days.

(21) Appl. No.: 10/403,955

(22) Filed: Mar. 31, 2003

(65) Prior Publication Data
US 2004/0192288 A1  Sep. 30, 2004

(51) Int. Cl.
*H04Q 7/20* (2006.01)
*H04B 17/00* (2006.01)

(52) U.S. Cl. ............. 455/419; 455/423; 455/67.11

(58) Field of Classification Search ........... 455/423, 455/418, 67.11, 424, 425, 419, 420; 379/1.01
See application file for complete search history.

(56) References Cited

U.S. PATENT DOCUMENTS

| | | | |
|---|---|---|---|
| 6,064,721 A * | 5/2000 | Mohammadian et al. | 379/21 |
| 6,766,165 B2 * | 7/2004 | Sharma et al. | 455/423 |
| 6,865,387 B2 * | 3/2005 | Bucknell et al. | 455/418 |
| 6,954,634 B1 * | 10/2005 | Bucknell et al. | 455/418 |
| 7,088,990 B1 * | 8/2006 | Isomursu et al. | 455/412.1 |
| 2003/0022661 A1 * | 1/2003 | Guterman | 455/418 |
| 2003/0157895 A1 * | 8/2003 | Agrawal et al. | 455/67.1 |
| 2003/0162539 A1 * | 8/2003 | Fiut et al. | 455/424 |
| 2004/0058652 A1 * | 3/2004 | McGregor et al. | 455/67.13 |
| 2004/0203719 A1 * | 10/2004 | Ross et al. | 455/423 |

FOREIGN PATENT DOCUMENTS

| | | |
|---|---|---|
| WO | WO 00/65851 | 11/2000 |
| WO | WO 00/67507 | 11/2000 |

* cited by examiner

*Primary Examiner*—Harry S Hong

(57) ABSTRACT

A mobile cellular communication device of an apparatus in one example employs one or more cellular communication standards to exchange one or more portions of network management information with a network infrastructure device, of one or more network infrastructure devices, that is employable with one or more of the one or more cellular communication standards.

21 Claims, 1 Drawing Sheet

CELLULAR COMMUNICATION STANDARD EMPLOYMENT BY MOBILE CELLULAR COMMUNICATION DEVICE FOR NETWORK MANAGEMENT INFORMATION EXCHANGE WITH NETWORK INFRASTRUCTURE DEVICE

TECHNICAL FIELD

The invention relates generally to wireless communication and more particularly to management of wireless networks.

BACKGROUND

With the popularity of mobile phones and multimedia devices and competition for subscribers, service providers desire to improve the efficiency of management of the wireless network infrastructure. One system for management and monitoring of a wireless network comprises an operations and maintenance center ("OMC") that monitors the status of numerous network infrastructure devices which operate and maintain the integrity of the wireless network. The wireless network in one example comprises a cellular network, for example, a general packet radio service ("GPRS") network.

To monitor and support the wireless network equipment, the network technicians present at the operations and maintenance center analyze the incoming network management information and diagnose any problems or inefficiencies in the network services. When a problem with a network infrastructure device occurs, situations can demand the network technician travel to the site of the malfunctioning device, execute diagnostic procedures, analyze the results, and determine the root cause of failure. One shortcoming of the system is a delay in responsiveness of the network technician to the solution of problems because the network technician must travel between the operations and maintenance center and the site of the network infrastructure devices to perform the tasks of diagnosis and service.

Another shortcoming of the system is that the delay in the responsiveness of the network technician to the solution of problems results in a loss of revenue to the service provider. The loss of revenue can be highly significant, especially during peak traffic. The network service provider desires the network elements to have maximal availability and cause minimal network down time.

When a network technician at the operations and maintenance center notices a malfunction, the network technician gathers information about the current network conditions to aid in diagnosis of the problem when the network technician travels to the site of the faulty network infrastructure device. When away from the operations and maintenance center, the network technician has no access to the updated information that exists at the operations and maintenance center regarding the faulty network infrastructure device. Since the loads on the network infrastructure devices have fast-changing natures, the information gathered by the network technician loses accuracy during the journey that the network technician makes to arrive at the network infrastructure device. Another shortcoming of the system could be an inability of the network technician to obtain the updated information of the operations and maintenance center from the external location of the network infrastructure device.

After arrival at the site of the faulty network infrastructure device, the network technician can diagnose and correct problems. In some instances, the problem can be corrected with an electronic update of the network infrastructure device, for example, a software or firmware update. When the electronic update can be performed from the operations and maintenance center through a communication path, only identification but not correction of the problem requires the presence of the network technician at the site of the faulty network infrastructure device. It therefore would be desirable for the technician to be able to identify the problem without having to travel to the site of the faulty network infrastructure device.

Thus, a need exists for a decreased requirement for physical presence of a network technician at a network infrastructure device of a cellular network to diagnose a problem of the network infrastructure device.

SUMMARY

The invention in one embodiment encompasses an apparatus. The apparatus comprises a mobile cellular communication device that employs one or more cellular communication standards to exchange one or more portions of network management information with a network infrastructure device, of one or more network infrastructure devices, that is employable with one or more of the one or more cellular communication standards.

Another embodiment of the invention encompasses a method. Employed are one or more cellular communication standards to send a request from a mobile cellular communication device toward a network infrastructure device to cause an execution by the network infrastructure device of one or more network management procedures.

A further embodiment of the invention encompasses an article. The article comprises one or more computer-readable signal-bearing media. The article includes means in the one or more media for employing one or more cellular communication standards to send a request from a mobile cellular communication device toward a network infrastructure device to cause an execution by the network infrastructure device of one or more network management procedures.

DESCRIPTION OF THE DRAWING

Features of exemplary implementations of the invention will become apparent from the description, the claims, and the accompanying drawing in which:

DETAILED DESCRIPTION

Figure 1:
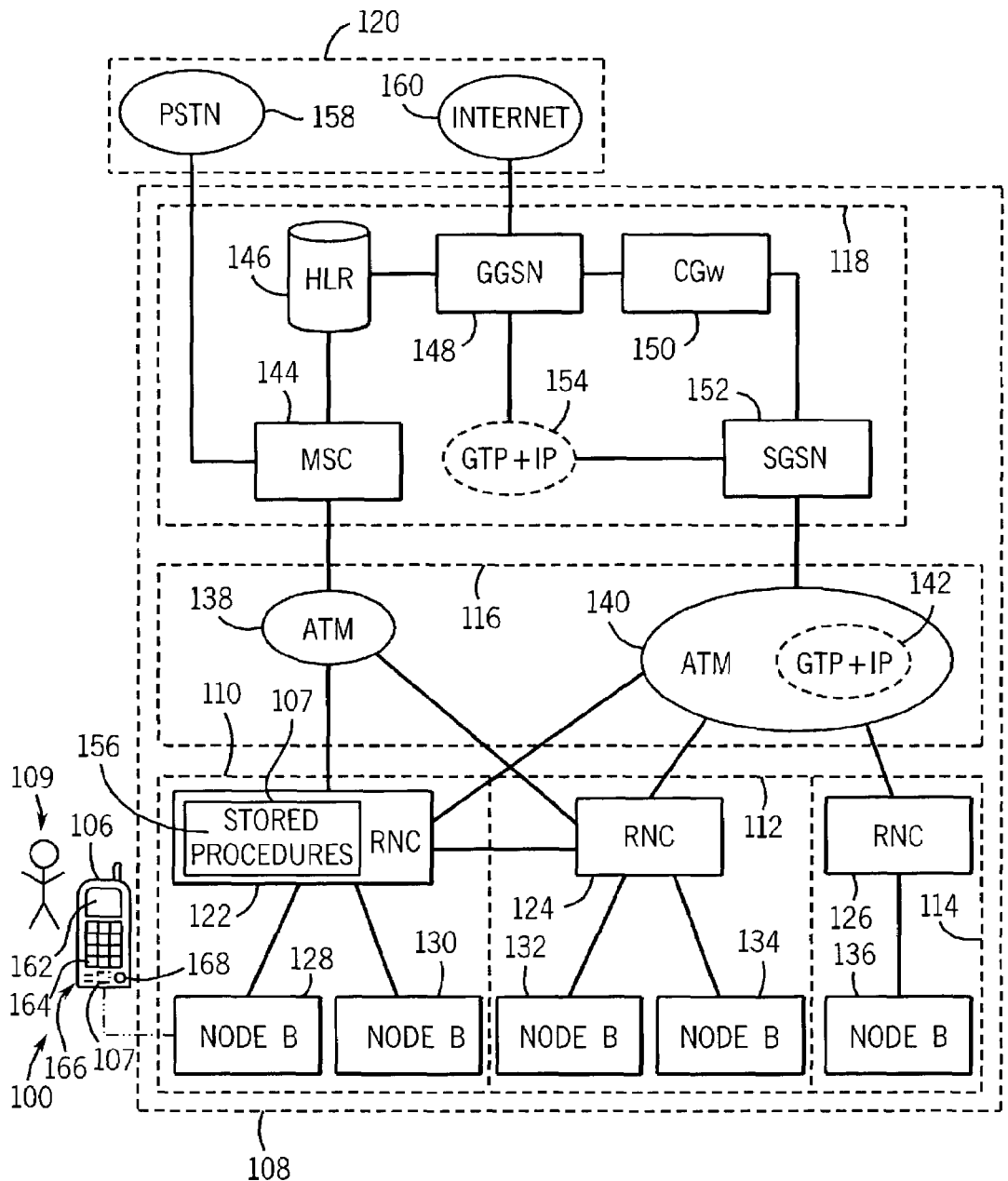
FIG. 1 is a representation of one example of an apparatus that comprises one or more mobile cellular communication devices, one or more communication networks, and one or more external networks with one or more cellular users that employ one or more of the mobile cellular communication devices to communicate with one or more network infrastructure devices of one or more of the communication network.

Turning to FIG. 1, an apparatus 100 in one example comprises a plurality of components such as computer software and/or hardware components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example comprises one or more mobile cellular communication devices 106, one or more communication networks 108, and one or more external networks 120. In addition, one or more cellular users 109 employ one or more of the mobile cellular communication devices 106 to communicate with one or more network infrastructure devices of the communication network 108. In one example, the cellular user 109 comprises a network technician that employs the mobile cellular communication device 106 to pursue solution of a problem with the network infrastructure devices of the communication network 108. In another example, the cellular user 109 comprises a cellular subscriber that employs the mobile cellular communication device 106 to receive one or more services provided by the communication network 108, as described herein.

The mobile cellular communication device 106 in one example comprises a cellular phone and/or a personal digital assistant ("PDA") and/or is operable with the third generation ("3G") cellular communication standard and/or the universal mobile telephone system ("UMTS") standard, both standards developed by the 3rd Generation Partnership Project (ETSI, Sophia-Antipolis Cedex, France 06921. The mobile cellular communication device 106 serves to allow the cellular user 109 to communicate with the communication network 108. The mobile cellular communication device 106 in one example employs one or more cellular communication standards, for example, the UMTS standard, to exchange network management information with one or more of the network infrastructure devices of the communication network 108.

In one example, the mobile cellular communication device 106 comprises a user interface. The user interface of the mobile cellular communication device 106 in one example serves to allow the cellular user 109 to manage one or more network infrastructure devices of the communication network 108. For example, the interface of the mobile cellular communication device 106 serves to allow the cellular user 109 to perform a diagnostic test, perform an upgrade of a software and/or firmware component, change a configuration, and/or service the network infrastructure devices of the communication network 108.

The user interface of the mobile cellular communication device 106 communicates (e.g., presents) network management information to the cellular user 109 using one or more representations, for example, graphics, text, and/or audio. Exemplary components of the user interface of the mobile cellular communication device 106 comprise one or more displays 162, one or more keys 164, one or more speakers 166, and one or more microphones 168. The mobile cellular communication device 106 in one example comprises software that serves to generate and/or facilitate the user interface. In one example, the mobile cellular communication device 106 comprises an instance of a recordable data storage medium 107. For example, the recordable data storage medium 107 serves to store the software of the mobile cellular communication device 106. The user interface of the mobile cellular communication device 106 in one example is created using a software programming language that allows the software to be executed on a variety of implementations of the mobile cellular communication device 106. Exemplary programming languages for implementing the user interface of the mobile cellular communication device 106 comprise Java™, offered by Sun Microsystems, Inc. (Santa Clara, Calif. 95054), and Visual Basic®, offered by Microsoft Corporation (Redmond, Wash., 98052).

Exemplary network infrastructure devices of the communication network 108 comprise radio network controllers ("RNCs") 122, 124, and 126, and radio terminals 128, 130, 132, 134, and 136 of corresponding radio network subsystems ("RNSs") 110, 112, and 114 as well as one or more mobile switching centers ("MSCs") 144, one or more home location registers ("HLRs") 146, one or more general packet radio service ("GPRS") gateway support nodes ("GGSNs") 148, one or more charging gateways ("CGws") 150, and one or more serving general packet radio service support nodes ("SGSNs") 152. One or more of the network infrastructure devices of the communication network 108 and/or the mobile cellular communication device 106 in one example comprise one or more procedures 156, as described herein. One or more instances of the recordable data storage medium 107 on one or more of the network infrastructure devices and/or the mobile cellular communication device 106 serve to store one or more of the procedures 156.

The communication network 108 in one example comprises the radio network subsystems 110, 112, and/or 114, one or more network interfaces 116, and/or one or more core networks 118. In one example, the communication network 108 comprises a cellular communication network, for example, that employs the UMTS standard. The radio network subsystems 110, 112, and 114 in one example comprise one or more of the network infrastructure devices. For example, radio network subsystems 110, 112, and 114 comprise the radio network controllers 122, 124, and 126, respectively, and respective sets of the radio terminals 128, 130, 132, 134, and 136. The radio terminals 128, 130, 132, 134, and 136 in one example comprise UMTS Node Bs, as will be appreciated by those skilled in the art.

In one example, the cellular user 109 employs the mobile cellular communication device 106 to communicate with the network infrastructure device of the communication network 108. Exemplary communication comprises an exchange of management and/or service information. Exemplary tasks the cellular user 109 performs through employment of the mobile cellular communication device 106 with respect to one or more of the e network infrastructure devices of the communication network 108 comprise diagnostic testing, upgrading, and reconfiguration. The components of the communication network 108 cooperate to provide a communication path for the information exchanged between the mobile cellular communication device 106 and the network infrastructure device of the communication network 108, as described herein.

In another example, the communication network 108 serves to provide one or more services to the cellular user 109 of the mobile cellular communication device 106. Exemplary services comprise voice service, data service, and short message service ("SMS"). The components of the communication network 108 cooperate to provide a communication path for the services provided to the mobile cellular communication device 106 by forwarding the content of the service through the components of the communication network 108. For example, a voice call from a public switched telephone network 158 to the cellular subscriber employing the mobile cellular communication device 106 follows a communication path from the public switched telephone network 158, to the mobile switching center 144, to the network switch 138, to the radio network controller 122, to the radio terminal 128, and finally to the mobile cellular communication device 106. A data transmission from a computer (not shown), for example, a component of the Internet 160, follows a communication path from the Internet 160, to the GPRS gateway support node 148, to the serving GPRS support node 152, to the network switch 140, to the radio network controller 122, to the radio terminal 128, and finally to the mobile cellular communication device 106.

Under management by the radio network controller 122 of the radio network subsystem 110, the radio terminal 128 in one example serves to synchronize with the mobile cellular communication device 106. Synchronization of the mobile cellular communication device 106 with one of the radio terminals 128, 130, 132, 134, or 136 allows direct communication via electromagnetic radiation signals between the radio terminal 128, 130, 132, 134, or 136 and the mobile cellular communication device 106. The mobile cellular communication device 106 in one example selects one of the radio terminals 128, 130, 132, 134, and 136 for synchronization based on factors such as signal strength and signal integrity.

As the cellular user 109 of the mobile cellular communication device 106 roams throughout service coverage areas of the radio network subsystems 110, 112, and 114, the mobile cellular communication device 106 synchronizes with different ones of the radio terminals 128, 130, 132, 134, and 136. When the cellular user 109 is receiving one or more services from the communication network 108 in an active communication session, the radio terminals 128, 130, 132, 134, and 136 hand off the communication session of the cellular user 109, as will be appreciated by those skilled in the art. In one example, the communication session of the cellular user 109 comprises an in-progress voice call from a component of the public switched telephone network 158. In another example, the communication session of the cellular user 109 comprises an in-progress data transmission from a computer (not shown), for example, a component of the Internet 160.

The network interface 116 in one example comprises one or more network switches 138 and/or 140. The network switches 138 and 140 in one example comprise respective asynchronous transfer mode ("ATM") switches. The network switch 140 in one example employs an interface protocol 142, for example, the general packet radio service tunneling protocol ("GTP+IP") developed by the 3rd Generation Partnership Project (ETSI, Sophia-Antipolis Cedex, France 06921). The interface protocol 142 in one example serves to facilitate communication (e.g., provide one or more communication paths) between the radio network subsystems 110, 112, and 114 and a portion of the core network 118.

The core network 118 in one example comprises the mobile switching centers 144, the home location registers 146, the general packet radio service gateway support nodes 148, the charging gateways 150, and the serving general packet radio service support nodes 152. In one example, the core network 118 serves to organize cellular subscriber information of the cellular user 109, handle billing claims for the cellular user 109, and/or provide a communication path to the external network 120, for example, to communicate a phone call between the cellular user 109 and a user of a landline phone (not shown) of the external network 120.

The mobile switching center 144 in one example serves as a routing and/or access point for circuit-switched communication sessions between the external network 120 and the mobile cellular communication device 106. The home location register 146 in one example serves to store the service profile and/or account information for the cellular user 109 of the mobile cellular communication device 106. The GPRS gateway support node 148 in one example serves as a routing and/or access point for packet-switched communication sessions between the external network 120 and the mobile cellular communication device 106. The charging gateway 150 in one example serves to manage the billing for the cellular subscribers of the communication network 108 (not shown). The serving GPRS support node 152 in one example serves as a routing and/or access point for packet-switched communication sessions between the radio network subsystems 110, 112, and 114 and the external network 120. The GPRS gateway support node 148 and the serving GPRS support node 152 in one example employ the interface protocol 154 to facilitate communication between the GPRS gateway support node 148 and the serving GPRS support node 152. The interface protocol 154 in one example comprises the general packet radio service tunneling protocol.

In one example, the procedures 156 relate to management of the network infrastructure device of the communication network 108 with which the mobile cellular communication device 106 exchanges network management information. For example, the procedures 156 in one example relate to statistics retrieval, diagnostics, configuration and upgrade procedures for the network infrastructure device with which the mobile cellular communication device 106 exchanges network management information. In another example, the procedures 156 relate to a relationship between the network infrastructure device with which the mobile cellular communication device 106 exchanges network management information and one or more additional network infrastructure devices of the communication network 108. The relationship between the network infrastructure device with which the mobile cellular communication device 106 exchanges network management information and the one or more additional network infrastructure devices of the communication network 108 in one example comprises the status and/or available bandwidth of a shared interface. The network infrastructure device with which the mobile cellular communication device 106 exchanges network management information in one example executes the procedures 156 to generate one or more results, for example, a configuration file, utilization history, and/or current system status. In a further example, one or more of the procedures 156 require one or more parameters for execution, for example, a software update to be stored and/or a statistic to retrieve.

The user interface of the mobile cellular communication device 106 communicates a listing (not shown) of one or more available procedures 156 that relate to the network infrastructure device with which the mobile cellular communication device 106 exchanges network management information. In one example, the available procedures 156 comprise a portion of the procedures 156 of the mobile cellular communication device 106 and/or the network infrastructure devices of the communication network 108. In a further example, the cellular user 109 and/or the mobile cellular communication device 106 choose which of the procedures 156 of the mobile cellular communication device 106 and/or the network infrastructure devices of the communication network 108 comprise the available procedures 156. The user interface of the mobile cellular communication device 106 in one example allows the cellular user 109 to choose a selected procedure 156 from the listing (not shown) of available procedures 156. The mobile cellular communication device 106 in one example requests the network infrastructure device to execute the selected procedure 156. In a further example, the user interface of the mobile cellular communication device 106 presents the results obtained from the execution of the selected procedure 156 to the cellular user 109. In a still further example, the user interface of the mobile cellular communication device 106 allows the cellular user 109 to input the one or more parameters for execution of one or more of the one or more selected procedures 156.

A request from the cellular user 109 of the mobile cellular communication device 106 in one example serves to trigger execution of the procedures 156. The network management information exchanged between the mobile cellular communication device 106 and the network infrastructure device of the communication network 108 in one example comprises a request to execute a procedure 156, the respective parameters of the procedure 156, and the return of the results generated by the procedure 156 to the mobile cellular communication device 106. The user interface of the mobile cellular communication device 106 in one example serves to generate respective parameters and results of the procedures 156. The user interface of the mobile cellular communication device 106 allows the cellular user 109 to employ one or more textual, graphical, and audio interfaces to select one or more of the one or more procedures 156 of the network infrastructure device of the communication network 108, as described herein.

The external network 120 in one example comprises one or more networks, for example, one or more public switched telephone networks ("PSTNs") 158, the Internet 160, one or more integrated services digital networks ("ISDNs") (not shown), one or more intranets (not shown), and/or one or more Internet service providers ("ISPs") (not shown). In one example, the external network 120 serves to provide content for services provided to the mobile cellular communication device 106 by connecting, for example, the public switched telephone network 158 for a voice call, or the Internet 160 for world wide web browsing.

An illustrative description of exemplary operation of the apparatus 100 is presented, for explanatory purposes. When the cellular user 109 wishes to employ the mobile cellular communication device 106 to exchange network management information with a network infrastructure device of the communication network 108 that is not accessible by a direct communication path from the mobile cellular communication device 106, the network infrastructure devices that comprise the communication network 108 cooperate to forward the network management information to the appropriate network infrastructure device. For example, the cellular user 109 wishes to employ the mobile cellular communication device 106 to communicate network management information with the radio network controller 122. The mobile cellular communication device 106 synchronizes with a radio terminal, for example, radio terminal 128. The mobile cellular communication device 106 sends the network management information to the radio terminal 128. The radio terminal 128 employs well-known forwarding techniques to determine that the network management information is intended for the radio network controller 122. The radio terminal 128 cooperates by forwarding the network management information to the radio network controller 122.

The cooperation of the network infrastructure devices of the communication network 108 allows the cellular user 109 of the mobile cellular communication device 106 to participate in an exchange with network infrastructure devices that are geographically distant by having the network management information forwarded through the network interface 116, the core network 118, and/or the external network 120. The mobile cellular communication device 106 and the network infrastructure devices that comprise the communication network 108 communicate using the same transmission protocols as one or more of the services provided by the communication network 108, which allows the network management information to be exchanged in real-time.

To perform a diagnostic test on the radio terminal 128, the cellular user 109 in one example employs the mobile cellular communication device 106 to exchange network management information with the radio terminal 128. The mobile cellular communication device 106 synchronizes with the radio terminal 128 to provide a wireless interface for communication between the mobile cellular communication device 106 and the radio terminal 128. The network management information in one example comprises a request to execute a procedure 156 on the radio terminal 128 which corresponds to the diagnostic test to be performed. The mobile cellular communication device 106 sends the network management information to the radio terminal 128. The radio terminal 128 receives the network management information and executes the procedure 156. In a further example, the radio terminal 128 sends a result generated by the procedure 156 to the mobile cellular communication device 106.

In a further example, the cellular user 109 employs the mobile cellular communication device 106 to exchange network management information with the radio network controller 122. The mobile cellular communication device 106 in one example communicates network management information to the radio terminal 128 and the radio terminal 128 forwards the network management information to the radio network controller 122. To reciprocate the exchange, the radio network controller 122 sends network management information to the radio terminal 128 and the radio terminal 128 forwards the network management information to the mobile cellular communication device 106.

To perform an upgrade of the radio terminal 130, the cellular user 109 in one example employs the mobile cellular communication device 106 to exchange network management information with the radio terminal 130. The mobile cellular communication device 106 synchronizes with the radio terminal 128 to provide a wireless interface for communication between the mobile cellular communication device 106 and the radio terminal 128. The network management information in one example comprises a request to execute a procedure 156 of the radio terminal 130 which corresponds to the upgrade action to be performed. The execution of the procedure 156 stores a portion of update information, for example, a new software program, on the radio terminal 130. In one example, the update information is a parameter to the procedure 156. The network management information comprises the parameter to the procedure 156. The mobile cellular communication device 106 sends the network management information to the radio terminal 128. The radio terminal 128 forwards the network management information to the managing radio network controller 122. The managing radio network controller 122 forwards the network management information to the radio terminal 130. The radio terminal 130 receives the network management information and executes the procedure 156. In a further example, the radio terminal 130 returns a result generated by the procedure 156 to the mobile cellular communication device 106 through the reverse path, from the radio terminal 130, to the radio network controller 122, to the radio terminal 128, and finally to the mobile cellular communication device 106.

To perform a diagnostic test on the radio network controller 124, the cellular user 109 in one example employs the mobile cellular communication device 106 to exchange network management information with the radio network controller 124. The mobile cellular communication device 106 synchronizes with the radio terminal 128 to provide a wireless interface for communication between the mobile cellular communication device 106 and the radio terminal 128. The network management information comprises a request to execute a procedure 156 of the radio network controller 124 which corresponds to the diagnostic test to be performed. The mobile cellular communication device 106 sends the network management information to the radio terminal 128. The radio terminal 128 then forwards the network management information to the radio network controller 122. The radio network controller 122 then forwards the network management information to the radio network controller 124. The radio network controller 124 receives the network management information and executes the procedure 156. The radio network controller 124 then sends a result generated by the procedure 156 to the mobile cellular communication device 106 through the reverse path, from the radio network controller 124 to the radio network controller 122, to the radio terminal 128, and finally to the mobile cellular communication device 106.

To reconfigure the serving GPRS support node 152 or the radio network controller 126, the cellular user 109 employs the mobile cellular communication device 106 to exchange network management information with the serving GPRS support node 152 or radio network controller 126. The mobile cellular communication device 106 synchronizes with the radio terminal 128 to provide a wireless interface for communication between the mobile cellular communication device 106 and the radio terminal 128. The network management information comprises a request to execute a procedure 156 of the radio network controller 124 which corresponds to the reconfiguration procedure to be performed.

The execution of the procedure 156 reconfigures the serving GPRS support node 152 or the radio network controller 126, for example, by modifying a routing table with an updated entry. In one example, the updated entry is a parameter to the procedure 156. The network management information comprises the parameter to the procedure 156. The mobile cellular communication device 106 sends the network management information to the radio terminal 128, which forwards the network management information to the radio network controller 122, which forwards the network management information to the network switch 140. The network switch 140 then forwards the network management information to the respective destination. The serving GPRS support node 152 or the radio network controller 126 receives the network management information and executes the procedure 156. In a further example, the serving GPRS support node 152 or the radio network controller 126 sends a result generated by the procedure 156 to the mobile cellular communication device 106 through the reverse path, from the serving GPRS support node 152 or the radio network controller 126 to the network switch 140, to the radio network controller 122, to the radio terminal 128, to the mobile cellular communication device 106. Using analogous forwarding, the mobile cellular communication device 106 can exchange network management information with any network infrastructure device of the core network 118 or the radio network subsystems 110, 112, or 114.

The cellular user 109 in one example employs the mobile cellular communication device 106 to exchange network management information with any device in the communication network 108. For example, the network switch 138 serves to switch communication that does not originate or terminate within the mobile cellular communication device 106, the core network 118, or the radio network subsystems 110, 112, and 114. The cellular user 109 in one example employs the mobile cellular communication device 106 to exchange network management information with the network switch 138 using known communication protocols. Exemplary devices that can be managed by the mobile cellular communication device 106 comprise the components and/or subcomponents of the external network 120, for example, the public switched telephone network 158 or the Internet 160, and others as will be appreciated by those skilled in the art.

The external network 120 in one example serves to connect a plurality of instances of the communication network 108. To exchange network management information with the GPRS gateway support node 148 of a second instance of the communication network 108, the cellular user 109 of the mobile cellular communication device 106 of a first instance of the communication network 108 sends network management information through the external network 120. For example, the mobile cellular communication device 106 of the first instance of the communication network 108 sends the network management information to the radio terminal 128. The radio terminal 128 forwards the network management information to the radio network controller 122. The radio network controller 122 forwards the network management information to the network switch 140. The network switch 140 forwards the network management information to the serving GPRS support node 152. The serving GPRS support node 152 forwards the network management information to the GPRS gateway support node 148. The GPRS gateway support node forwards the network management information to the Internet 160. The Internet 160 forwards the network management information to the GPRS gateway support node 148 of the second instance of the communication network 108.

The apparatus 100 in one example employs one or more computer-readable signal-bearing media. One example of a computer-readable signal-bearing medium for the apparatus 100 comprises an instance of the recordable data storage medium 107 such as one or more of a magnetic, electrical, optical, biological, and atomic data storage medium. In another example, a computer-readable signal-bearing medium for the apparatus 100 comprises a modulated carrier signal transmitted over a network comprising or coupled with the apparatus 100, for instance, one or more of a telephone network, a local area network ("LAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

I claim:

1. An apparatus, comprising:
    a mobile cellular communication device that is configured to employ one or more cellular communication standards to exchange one or more portions of network management information with a network infrastructure device, of one or more network infrastructure devices, without communication with a management infrastructure device, wherein the network infrastructure device is employable with one or more of the one or more cellular communication standards;
    wherein the mobile cellular communication device is configured to exchange the one or more portions of network management information with the network infrastructure device to one or more of manage and service the network infrastructure device independent of the management infrastructure device;
    wherein the mobile cellular communication device comprises a graphical user interface that is configured to allow a user of the mobile cellular communication device to select one or more management procedures for execution to one or more of manage and service the network infrastructure device independent of the management infrastructure device;
    wherein the mobile cellular communication device comprises a cellular phone or personal digital assistant that is operable with the one or more of the one or more cellular communication standards to receive a wireless voice, data, and/or short message service.

2. The apparatus of claim 1, wherein the mobile cellular communication device is configured to receive the wireless voice, data, and/or short message service from the network infrastructure device.

3. The apparatus of claim 1, wherein one or more of the one or more cellular communication standards are compatible with a universal mobile telephone system (UMTS) standard;
wherein the mobile cellular communication device is configured to employ the one or more of the one or more cellular communication standards that are compatible with the UMTS standard to exchange the one or more portions of network management information with the network infrastructure device.

4. The apparatus of claim 3 in combination with the network infrastructure device, wherein the network infrastructure device is configured to employ the one: or more of the one or more cellular communication standards that are compatible with the UMTS standard to exchange the one or more portions of network management information with the mobile cellular communication device.

5. The apparatus of claim 1, wherein the graphical user interface is configured to allow the user to select one or more selected management procedures from one or more available management procedures;
wherein the mobile cellular communication device is configured to perform one or more management operations related to one or more of the one or more network infrastructure devices based on an execution of one or more of the one or more selected management procedures.

6. The apparatus of claim 5, wherein one or more of the network infrastructure device and the mobile cellular communication device is configured to store the one or more available management procedures.

7. The apparatus of claim 5, wherein the one or more portions of network management information comprise a plurality of portions of network management information;
wherein one or more portions of the plurality of portions of network management information comprise one or more requests for the execution of the one or more of the one or more selected management procedures;
wherein the mobile cellular communication device is configured to send the one or more requests to the network infrastructure device to cause the execution of the one or more of the one or more selected management procedures.

8. The apparatus of claim 5, wherein the one or more portions of network management information comprise a plurality of portions of network management information;
wherein one or more portions of the plurality of portions of network management information comprise one or more results from the execution of the one or more of the one or more selected management procedures;
wherein the user interface of the mobile cellular communication device is configured to allow the user to employ one or more of the one or more of the textual, graphical, and audio interface to receive the one or more results.

9. The apparatus of claim 5, wherein one or more of the one or more selected management procedures employ one or more parameters for an execution of one or more of the one or more of the one or more selected management procedures;
wherein the user interface is configured to allow the user to employ one or more of the one or more of the textual, graphical, and audio interface to input the one or more parameters.

10. The apparatus of claim 9, wherein the one or more portions of network management information comprise a plurality of portions of network management information, wherein one or more portions of the plurality of portions of network management information comprise the one or more parameters;
wherein the mobile cellular communication device is configured to send the one or more parameters to the network infrastructure device for employment in the execution of the one or more of the one or more of the one or more selected management procedures.

11. The apparatus of claim 1, wherein the mobile cellular communication device is configured to exchange the network management information exclusively with the network infrastructure device to one or more of manage and service the network infrastructure device;
wherein the network infrastructure device is configured to provide one or more wireless services to the mobile cellular communication device.

12. The apparatus of claim 1, wherein the one or more portions of network management information comprise one or more first portions of network management information and one or more second portions of network management information, wherein the network infrastructure device comprises a first network infrastructure device, wherein the one or more network infrastructure devices comprise a second network infrastructure device;
wherein the mobile cellular communication device is configured to employ one or more of the one or more cellular communication standards to exchange the one or more first portions of network management information with the first network infrastructure device;
wherein the mobile cellular communication device is configured to employ one or more of the one or more first portions of network management information to one or more of manage and service the first network infrastructure device;
wherein the mobile cellular communication device is configured to employ one or more of the one or more cellular communication standards to exchange the one or more second portions of network management information with the second network infrastructure device;
wherein the mobile cellular communication device is configured to employ one or more of the one or more second portions of network management information to one or more of manage and service the second network infrastructure device.

13. The apparatus of claim 1, wherein the mobile cellular communication device is configured to employ one or more of the one or more portions of network management information and input from the user to perform a diagnostic test on the network infrastructure device.

14. The apparatus of claim 1, wherein the network infrastructure device comprises one or more of a software and firmware component;
wherein the mobile cellular communication device is configured to employ one or more of the one or more portions of network management information and input from the user to perform an upgrade of the one or more of the software and the firmware component of the network infrastructure device.

15. The apparatus of claim 1, wherein the network infrastructure device comprises one or more of a software and firmware component wherein the one or more of the software and the firmware component comprises a configuration;
wherein the mobile cellular communication device is configured to employ one or more of the one or more portions of network management information to change the configuration of the one or more of the software and the firmware component of the network infrastructure device.

16. The apparatus of claim 1, wherein the mobile cellular communication device is configured to employ the one or more of the one or more cellular communication standards to one or more of manage and service the network infrastructure device in real-time independent of the management infrastructure device.

17. The apparatus of claim 1 in combination with a plurality of network infrastructure devices of the one or more network infrastructure devices, wherein the network infrastructure device comprises a mobile switching center, wherein the plurality of network infrastructure devices comprise the mobile switching center, a radio terminal, a radio network controller, and a network switch;
   wherein the radio terminal, the radio network controller, and the network switch are configured to cooperate to provide a communication path between the mobile cellular communication device and the mobile switching center;
   wherein the mobile cellular communication device is configured to send one or more of the one or more portions of network management information over the communication path to the mobile switching center.

18. The apparatus of claim 1, in combination with the network infrastructure device, wherein the one or more network infrastructure devices cooperate to forward the network management information to the network infrastructure device.

19. A method, comprising the step of:
   selecting one or more network management procedures from a network infrastructure device based on input from a user of a mobile cellular communication device for a listing of network management procedures;
   communicating the listing of network management procedures to the user of the mobile cellular communication device;
   selecting a selected network management procedure from the listing of network management procedures based on input from the user of the mobile cellular communication device;
   sending a request from the mobile cellular communication device to the network infrastructure device through employment of one or more cellular communication standards and without communication with a management infrastructure device to cause an execution by the network infrastructure device of the selected network management procedure for one or more of management and service of the network infrastructure device, wherein the network infrastructure device is configured to provide one or more wireless services to the mobile cellular communication device, wherein the mobile cellular communication device comprises a cellular phone or personal digital assistant that is operable with the one or more of the one or more cellular communication standards to receive a wireless voice, data, and/or short message service.

20. The method of claim 19, wherein the step of sending the request comprises the steps of:
   presenting to the user of the mobile cellular communication device the listing of network management procedures through employment of the user interface;
   obtaining the user input from the user through employment of the user interface;
   determining a selection of the selected network management procedure from the listing of network management procedures based on the user input;
   sending one or more requests to the network infrastructure device to cause an execution by the network infrastructure device of the selected network management procedure;
   receiving at the mobile cellular communication device one or more results from the execution by the network infrastructure device of the selected network management procedure; and
   presenting to the user the one or more results through employment of the user interface.

21. The method of claim 20, wherein the step of obtaining the user input from the user through employment of the user interface comprises the steps of:
   obtaining one or more parameters from the user through employment of the user interface; and
   sending the one or more parameters to the network infrastructure device for employment in an execution by the network infrastructure device of the selected network management procedure.

* * * * *